United States Patent [19]

Hopper

[11] Patent Number: 5,011,263

[45] Date of Patent: Apr. 30, 1991

[54] PERFORATE PROJECTION SCREEN

[75] Inventor: Clayton L. Hopper, Canal Fulton, Ohio

[73] Assignee: Astro-Tec Manufacturing, Inc., Canal Fulton, Ohio

[21] Appl. No.: 522,371

[22] Filed: May 11, 1990

[51] Int. Cl.$^5$ .............................................. G03B 21/56
[52] U.S. Cl. ..................................... 350/125; 350/119; 52/81
[58] Field of Search .................... 52/81; 350/118, 119, 350/125

[56] References Cited

U.S. PATENT DOCUMENTS

| | | | |
|---|---|---|---|
| 2,238,365 | 4/1941 | Hurley | 350/118 |
| 2,366,761 | 1/1945 | Walker | 350/117 |
| 2,699,090 | 1/1955 | Underhill, Jr. | 350/119 |
| 3,260,156 | 7/1966 | Komitor | 350/119 |
| 3,632,185 | 1/1972 | Meanor | 350/125 |
| 3,692,384 | 9/1972 | Kimura et al. | 350/119 |
| 3,992,841 | 11/1976 | Ward, Jr. | 350/125 X |
| 4,057,323 | 11/1977 | Ward, Jr. | 350/125 |
| 4,750,807 | 6/1988 | Chamayou Dit Felix | 350/125 |

Primary Examiner—Richard A. Wintercorn
Attorney, Agent, or Firm—Paul E. Milliken

[57] ABSTRACT

A perforate projection screeen for movies, planetariums and the like having uniform reflectivity throughout its visible surface.

The screen is made from a plurality of perforate panels and is mounted, when in use, with a dark non-reflective chamber behind the screen. Any overlapped areas of the panels and any frame members or other objects, in close proximity to the back of the panels are covered with a black velour type material having vertically extending fibers to absorb the light rays entering the holes in those areas of the panels and thereby prevent light reflection from such holes which would cause undesirable light strips or areas to be visible in the overlapped portions of the screen or in the area of the screen where frame members or other objects are in close proximity to the back of the panel.

12 Claims, 3 Drawing Sheets

PERFORATE PROJECTION SCREEN

This invention relates to a perforate projection screen having substantially uniform reflectivity throughout its visible surface which may be used in applications such as a motion picture screen or a planetarium.

BACKGROUND OF THE INVENTION

The use of perforate projection screens is well known in the prior art as shown and described in U.S. Pat. Nos. 2,366,761 issued to R. O. Walker, U.S. Pat. No. 3,992,841 issued to R. Ward, Jr. and U.S. Pat. No. 4,750,807 issued to G. Chamayou dit Felix.

Perforate screens are particularly useful as spherical or geodesic dome shaped screens used in planetariums to permit the flow of heating and cooling air through the screen to the inside of the domed screen from the space between the screen and the exterior dome of the planetarium thereby assuring the proper ventilation and temperature is maintained inside the domed screen and the viewing area of the planetarium.

One of the problems encountered when using a perforate screen is that when lap joints are used to connect adjacent perforate panels of the screen, the holes in overlapping edges of the adjacent panels are not always in alignment with each other and the surface of the overlapped panel sometimes shows through the holes in the overlapping panel edge thereby creating a strip of greater reflectivity than the rest of the surfaces of the panels where the holes are not blocked by the surface of an overlapped panel, or by a supporting frame member or some other object in close proximity to the back of the panel.

The prior art devices have attempted to eliminate these areas of greater reflectivity by applying black paint or black tape to the surface of any overlapped panel edges or frame members which would show through the holes in the overlapping perforate panels.

It has been found however, that even when black paint or tape is used to cover the overlapped surfaces there is still sufficient reflectivity from the black surfaces that the overlapped surfaces showing through the holes still create strips or areas of higher reflectivity than the rest of the screen. These strips or areas show up as light strips or other shapes on the screen and thereby break the desired continuity of the screen and distract from the images being projected on the screen.

OBJECTS OF THE INVENTION

It is a primary object of this invention to provide a perforate projection screen utilizing a simple and inexpensive solution to the problem of non-uniform reflectivity in lap joint areas of the projection screen and in areas of the screen where frame members or other objects are located in contact with or in close proximity to the back side of the screen. Another object of this invention is to provide a perforate projection screen having substantially uniform reflectivity throughout its visible surface without resorting to any structural changes in either the perforate panels or their supporting frame members.

A still further object of this invention is to provide a perforate projection screen with no visible lines or other shapes on the viewing surface of the screen which distract from the images being projected thereon.

These and other objects of the invention will become more fully apparent in the following specification and the attached drawings.

SUMMARY OF THE INVENTION

This invention is a perforate projection screen with substantially uniform reflectivity throughout its visible surface comprising at least one perforate panel having a light reflective surface on one side thereof and a plurality of rows of holes therethrough located substantially throughout the entire reflective surface of each such panel, each such panel adapted to be mounted a spaced distance from a substantially non-reflective surface, thereby creating a substantially uniformly dark non-reflective chamber behind the panel and a dark material covering the surfaces of any objects which are in sufficiently close proximity to the back of the panel to be visible through the holes in the panel without such covering, said dark material having a textured surface comprised of a plurality of dark fibers extending vertically from the surface thereof to reduce the surface reflectivity of all such objects so that they are not visible through the holes in the panels.

DESCRIPTION OF THE PREFERRED EMBODIMENTS

Figure 1:
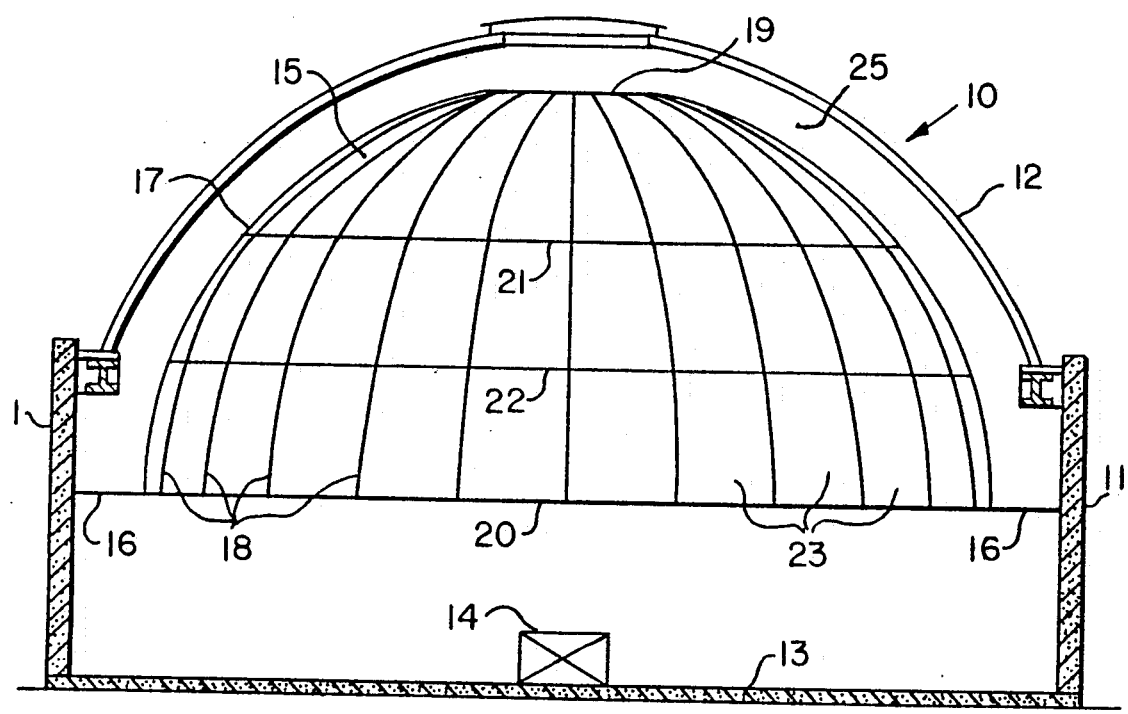
FIG. 1 is a side elevational view of a planetarium with portions of the walls and outer dome broken away to show the dome shaped perforate projection screen.

Referring now to the drawings and in particular to FIG. 1, a planetarium indicated generally by the numeral 10 has vertical side walls 11 with a spherical shaped exterior dome 12 mounted thereon. A floor 13 extends between the side walls 11 and has a projection area 14 near the center thereof. A perforate screen 15 in the shape of a geodesic dome or hemisphere is attached to the side walls 11 by suitable connecting frame members 16. The screen 15 is supported by a hemispherical frame assembly 17 consisting of a plurality of arcuate frame members 18 extending radially outwardly and downwardly from a top ring 19 to a bottom ring 20. A pair of intermediate rings 21 and 22 are attached, by bolts and brackets or any other suitable means, to each of the frame members 18 between the top ring 19 and bottom ring 20. The rings 19, 20 21 and 22 all lie in parallel horizontal planes.

The frame members 18 and the rings 19 through 22 may be made of beams or tubing of aluminum or other suitable material.

Figure 5:
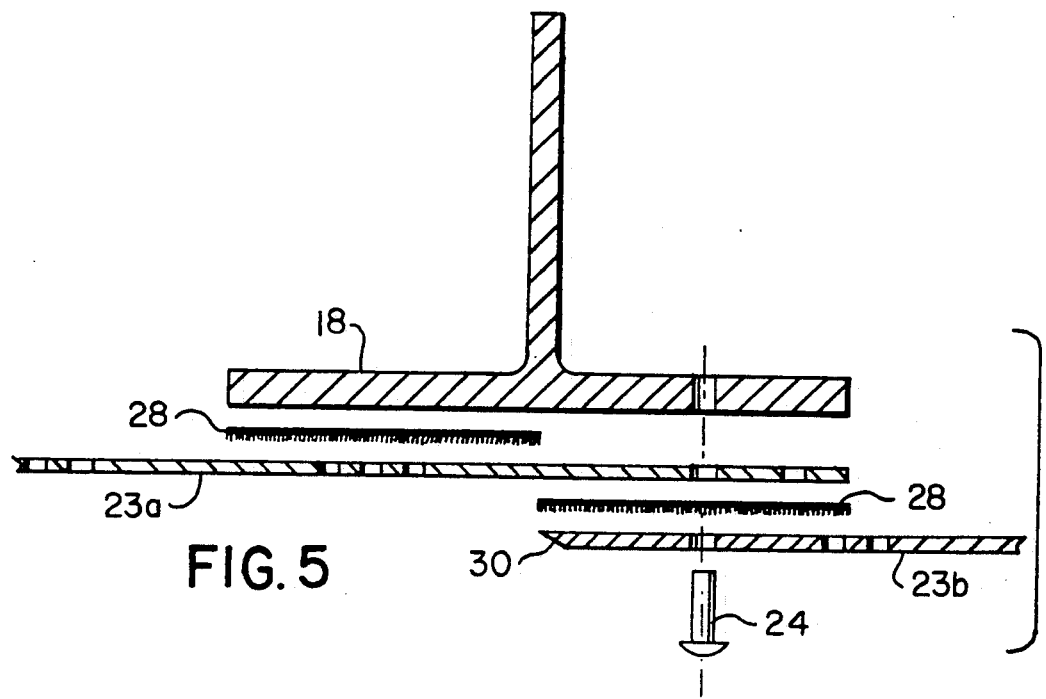
FIG. 5 is an exploded cross-sectional view taken on line 5—5 of FIG. 4.
Figure 3:
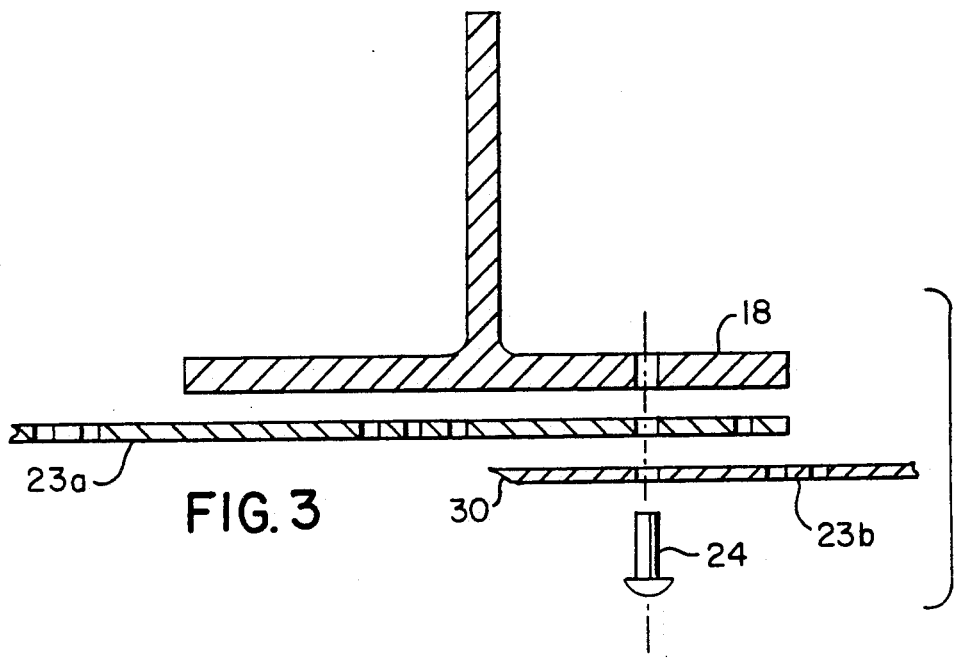
FIG. 3 is an exploded cross-sectional view taken on line 3—3 of FIG. 2.

A plurality of trapezoid-shaped perforate panels 23 of aluminum or other suitable material are attached to the inner surfaces of the frame members 18 and rings 19 through 22 by rivets 24 as shown in FIG. 3 or 5 or by other means. The panels 23 in the present example are made of 0.040" thick aluminum, however, other thicknesses and other materials may also be used for the panels depending upon the various design requirements of each particular screen.

When the assembled projection screen 15 is mounted inside the exterior dome 12 as shown in FIG. 1, the screen 15 and the dome 12 define a dark annular chamber 25 therebetween.

Figure 2:
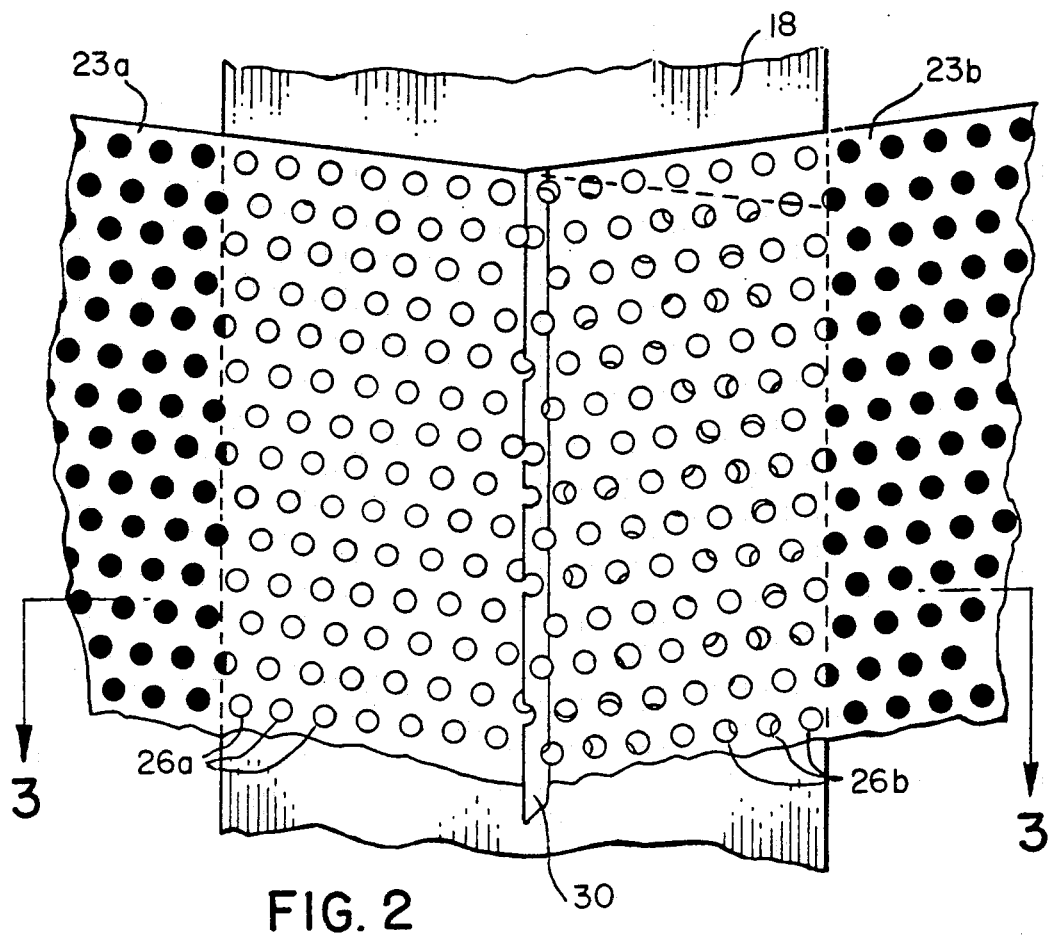
FIG. 2 is an enlarged fragmentary view of a portion of the perforate projection screen shown in FIG. 1 with an overlapped portion of one panel and a supporting frame member showing through the holes in the overlapping panel.

Depending upon the use of the projection screen and the amount of reflectivity needed, the inner or reflective surface of the screen 15 is coated or painted white or some shade of gray. When the screen 15 is in position within the planetarium 10, the dark annular chamber 25 shows through the holes 26 in the panels 23 as a plurality of small black dots as shown in FIG. 2. At a viewing distance from the screen, due to the small size of the holes, (1/16" dia. on ⅛" staggered centers) the dark holes and the light color of the reflective surface of the screen visually merge together like a half-tone photograph to give the appearance of a shade of light gray when a light is projected upon the screen.

Referring again to FIG. 2 and also to FIG. 3, there is shown a lap joint of two adjacent panels 23a and 23b with panel 23a being overlapped by 23b and both panels riveted to the frame member 18 by rivets such as 24.

When the panels 23a and 23b are assembled on the frame member 18 in this manner it may be seen from FIG. 2 that the overlapped edge of panel 23a shows through the holes 26b in the panel 23b. The surface of the frame member 18 also shows through the holes 26a in the panel 23a and through part of the holes in both panels 23a and 23b which happen to be in alignment with each other. It may also be seen from FIG. 2 that the reflected light from the reflective surfaces of the frame member 18 and the panel 23a which show through the holes 26a and 26b creates a strip of greater reflectivity in the area of the lap-joint and the frame member 18 than in the remaining surface of the panels where the holes 26 are in communication with the dark chamber 25. This results in a lighter strip appearing in all the lap-joints and in front of all the frame members 18 and the rings 19 through 22 or in any other area where a reflective object is in close proximity to the back of any of the panels 23.

Figures 6, 7:
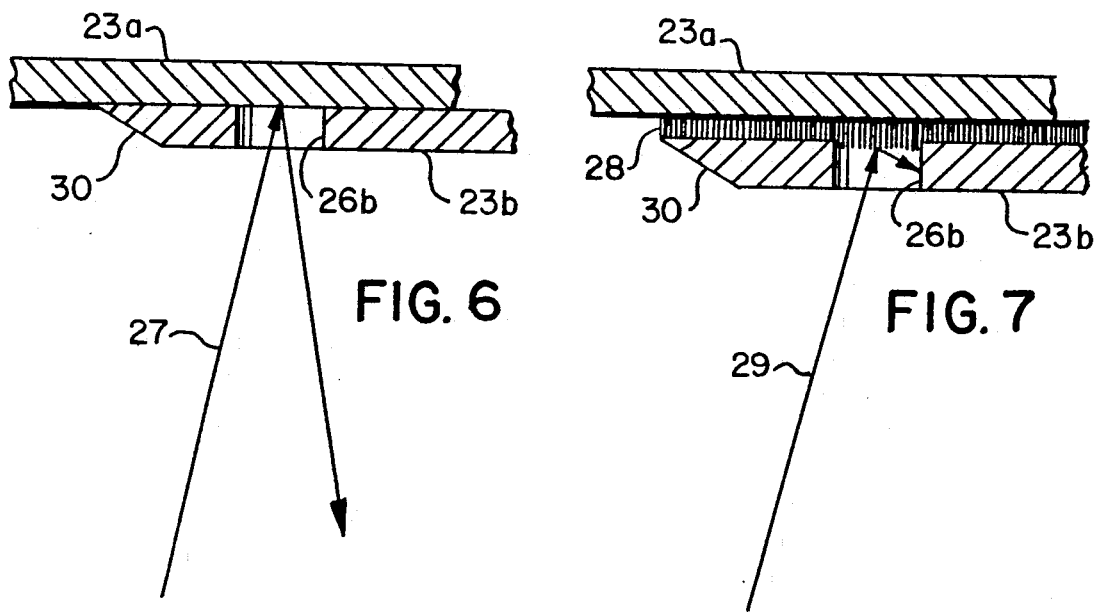
FIG. 6 is a greatly enlarged cross-sectional view of a portion of the panels shown in FIGS. 2 and 3 showing the reflection of light from the overlapped panel.
FIG. 7 is a greatly enlarged cross-sectional view of a portion of the panels shown in FIGS. 4 and 5 showing the reduction in reflectivity caused by positioning a dark sheet of material with vertically extending fibers between the overlapped portion of the two adjacent panels.

FIG. 6 illustrates how the light ray 27 passes through the hole 26b in the panel 23b and bounces off the reflective surface of the panel 23a. It has been found that even when the overlapped portion of the panel 23a or a frame member 18 is painted black or covered with plain black tape there is still sufficient reflectivity from the black paint or tape that a light strip or area will be visible on the screen 15.

Figure 4:
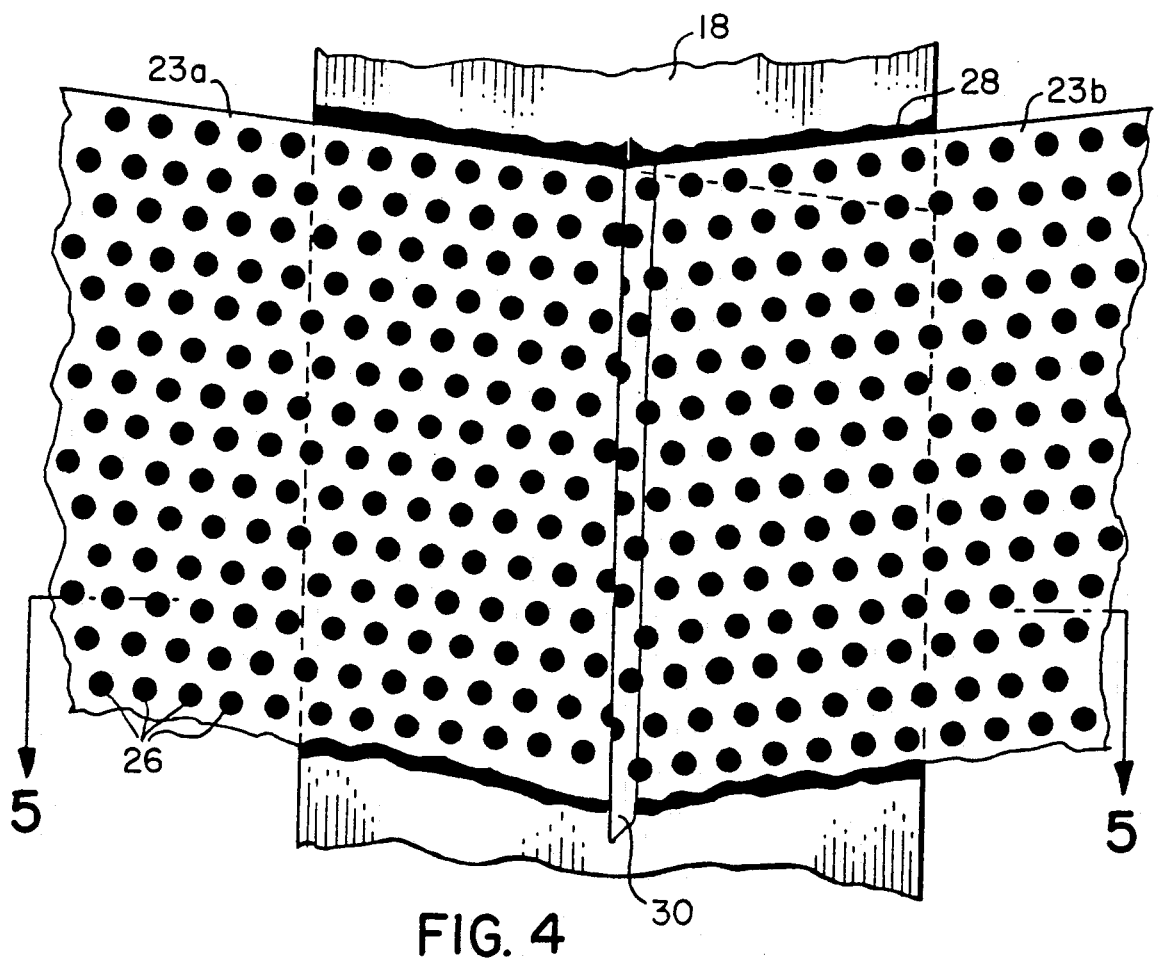
FIG. 4 is an enlarged fragmentary view similar to that shown in FIG. 2 but with dark material with vertically extending fibers positioned between the overlapping portions of the panels and between one of the panels and the supporting frame member.

FIGS. 4 and 5, shows an assembly similar to that shown in FIGS. 2 and 3 except that a strip preferably of black velour type material 28 having vertically extending fibers is attached to cover the reflective surfaces of the frame member 18 and the overlapped portion of the panel 23a. The vertically extending fibers of the material 28 either absorb any projected light rays or deflect them at a low angle as shown in FIG. 7 where the light ray 29 passes through the hole 26b and is trapped within the hole and thereby gives the visual impression shown in FIG. 4 where all the holes covered by the strip of dark velour material 28 have the same dark visual appearance as the holes 26 in communication with the dark chamber.

Thus it can be seen that the entire visible surface of the screen 15 can be made to provide uniform reflectivity by inserting the velour type material 28 to cover all overlapped joints and all frame members or other objects in close proximity to the back of the perforate screen 15.

It should be understood that the black velour type material can be used on curved, spherical shaped or flat projection screens to provide uniform reflectivity and eliminate light lines or other shapes on the visible surface of the screen.

As a further means of preventing unwanted lines or shadows on the visible surface of the screen 15 the edge 30 of the overlapping panel 23b is beveled as shown in FIGS. 3, 5, 6 and 7. The beveled edge 30 is then painted or coated the same color as the rest of the reflective surface of the screen 15.

These and various other modifications can be made herein without departing from the scope of the invention.

I claim:

1. A perforate projection screen with substantially uniform reflectivity throughout its visible surface comprising:
    (A) at least one perforate panel having;
        (1) a light reflective surface on one side thereof, and
        (2) a plurality of rows of holes therethrough located substantially throughout the entire reflective surface of each such panel,
    (B) each such panel adapted to be mounted a spaced distance from a substantially non-reflective surface, thereby creating a substantially uniformly dark non-reflective chamber behind the panel; and
    (C) a dark material covering the surfaces of any objects which are in sufficiently close proximity to the back of the panel to be visible through the holes in the panel without such covering, said dark material having a textured surface comprised of a plurality of dark fibers extending vertically from the surface thereof to reduce the surface reflectivity of all such objects so that they are not visible through the holes in the panel.

2. The perforate projection screen as claimed in claim 1 wherein at least one of the objects covered by the dark material is an overlapped edge of an adjacent perforate panel.

3. The perforate projection screen as claimed in claim 1 wherein the object covered by the dark material is a supporting frame member attached to the back surface of the panel.

4. The perforate projection screen as claimed in claim 1 wherein the dark material is black velour.

5. The perforate projection screen as claimed in claim 1 wherein the vertically extending fibers of the dark material extend into the holes of the perforate panel in the portion of the panel which lies in front of the object covered by the dark material.

6. The perforate projection screen as claimed in claim 1 wherein the dark material covers both overlapped portions forming joints between adjacent panels and supporting frame members attached to the back of the panels.

7. The perforate projection screen as claimed in claim 1 wherein the screen is in the shape of a portion of a sphere.

8. A perforate projection screen with substantially uniform reflectivity throughout its visible surface comprising:

(A) a plurality of perforate panels assembled together, each panel having;
  (1) a light reflective surface on one side thereof, and
  (2) a plurality of rows of holes therethrough located substantially throughout the entire reflective surface of each panel, (B) each panel being mounted in a working environment wherein a substantially uniformly dark non-reflective space is located behind the panel in such manner that when light is projected upon the screen, light is reflected only from the reflective surface of the panel and there is substantially no light reflected through the holes from the dark area behind the panel;

(C) each panel being mounted with at least one of its edges overlapping an edge of the next adjacent panel; and (D) a strip of dark material located between the overlapped edges of each panel and covering each overlapped edge in such manner that no part of the reflective surface of the overlapped panel edge is visible through the holes in the overlapping panel, said strip of dark material having a textured surface comprised of a plurality of dark fibers extending vertically from the surface thereof to reduce the reflectivity in the area within the holes in the overlapping edge to provide the same visual appearance of the screen surface in the area of the overlapped joints as in all the other portions of the screen.

9. The perforate projection screen as claimed in claim 8 wherein the dark material is black velour.

10. The perforate projection screen as claimed in claim 8 wherein the vertically extending fibers of the dark material extend into the holes of the perforate panel in the portion of the panel which lies in front of the object covered by the dark material.

11. The perforate projection screen as claimed in claim 8 wherein in addition to covering the overlapped edges of each panel the dark material also covers any frame members or other objects in close proximity to the back of the screen.

12. The perforate projection screen as claimed in claim 8 wherein the screen is in the shape of a portion of a sphere.

* * * * *